(12) United States Patent
Aono et al.

(10) Patent No.: US 9,188,971 B2
(45) Date of Patent: Nov. 17, 2015

(54) PROGRAMMABLE TERMINAL SYSTEM

(75) Inventors: Masato Aono, Kusatsu (JP); Shinichi Kojima, Kurobe (JP); Hiroki Murata, Nyuzen-machi (JP)

(73) Assignee: Omron Corporation, Kyoto-shi (JP)

( * ) Notice: Subject to any disclaimer, the term of this patent is extended or adjusted under 35 U.S.C. 154(b) by 3049 days.

(21) Appl. No.: 11/373,511

(22) Filed: Mar. 13, 2006

(65) Prior Publication Data
US 2006/0224661 A1     Oct. 5, 2006

(30) Foreign Application Priority Data

Mar. 30, 2005 (JP) ................. P2005-100134

(51) Int. Cl.
  *G06F 15/16* (2006.01)
  *G05B 19/042* (2006.01)
  *G05B 19/05* (2006.01)
(52) U.S. Cl.
  CPC .......... *G05B 19/0423* (2013.01); *G05B 19/054* (2013.01); *G05B 19/0426* (2013.01); *G05B 19/056* (2013.01)
(58) Field of Classification Search
  CPC ............... G05B 19/054; G05B 19/056; G05B 19/0423; G05B 19/0426
  USPC .............. 709/246, 209, 219, 223; 700/19, 83; 348/14.08; 375/240.1; 715/733; 345/1.2
  See application file for complete search history.

(56) References Cited

U.S. PATENT DOCUMENTS

| | | | |
|---|---|---|---|
| 4,498,151 A | | 2/1985 | Henry et al. |
| 5,635,979 A | * | 6/1997 | Kostreski et al. ............. 725/132 |
| 5,657,461 A | * | 8/1997 | Harkins et al. ................ 715/733 |
| 5,713,036 A | | 1/1998 | Kamiguchi et al. |
| 6,867,749 B1 | * | 3/2005 | Ii et al. ............................ 345/1.1 |
| 7,010,368 B2 | * | 3/2006 | Otani et al. ...................... 700/86 |
| 7,043,553 B2 | * | 5/2006 | Monsen et al. ............... 709/229 |
| 7,080,175 B2 | * | 7/2006 | Imai et al. ..................... 710/113 |

(Continued)

FOREIGN PATENT DOCUMENTS

| | | |
|---|---|---|
| CN | 1418332 | 5/2003 |
| EP | 1 280 027 | 1/2003 |

(Continued)

OTHER PUBLICATIONS

European Search Report. Reference P12328EP—Date: Jun. 17, 2006 Appl. No. 06004853.5-2206.

*Primary Examiner* — Viet Vu
*Assistant Examiner* — Michael A Chambers
(74) *Attorney, Agent, or Firm* — Foley & Lardner LLP

(57) ABSTRACT

A Programmable Terminal (PT) system, a PT device and a PT system management method having a function of displaying a screen having a content on a display screen while at the same time positively preventing the leakage of confidential content are disclosed. When a part read from a screen data file corresponds to the part including a content acquired from a server device, a transmission request command including a information indicating a storage location of a content data corresponding to the contents in the server device is transmitted to the server device through a communication circuit, the content data arriving as a response from the server device is acquired through the communication circuit and stored in a volatile memory. The part is plotted and displayed using the content data stored in the volatile memory and a part configuration information contained in the screen data file in a nonvolatile memory.

1 Claim, 18 Drawing Sheets

Functional configuration of programmable terminal according to the invention

(56) References Cited

U.S. PATENT DOCUMENTS

| | | | |
|---|---|---|---|
| 7,103,421 B2 * | 9/2006 | Ii et al. | 700/19 |
| 7,120,631 B1 * | 10/2006 | Vahalia et al. | 1/1 |
| 7,358,928 B2 * | 4/2008 | Mori et al. | 345/1.1 |
| 7,456,839 B2 * | 11/2008 | Kainuma | 345/564 |
| 7,467,231 B2 * | 12/2008 | Kegoya et al. | 709/246 |
| 2002/0156829 A1 * | 10/2002 | Yoshimine | 709/201 |
| 2003/0120949 A1 * | 6/2003 | Redlich et al. | 713/200 |
| 2003/0177440 A1 * | 9/2003 | Kegoya et al. | 715/500 |
| 2004/0013266 A1 * | 1/2004 | Giraud | 380/1 |
| 2004/0218036 A1 * | 11/2004 | Boss et al. | 348/14.08 |
| 2005/0114535 A1 * | 5/2005 | Ii et al. | 709/230 |
| 2005/0138110 A1 * | 6/2005 | Redlich et al. | 709/201 |
| 2006/0085347 A1 * | 4/2006 | Yiachos | 705/51 |
| 2006/0179120 A1 * | 8/2006 | Kegoya et al. | 709/217 |
| 2006/0179121 A1 * | 8/2006 | Kegoya et al. | 709/217 |
| 2006/0190624 A1 * | 8/2006 | Kegoya et al. | 709/246 |
| 2007/0183493 A1 * | 8/2007 | Kimpe | 375/240.1 |

FOREIGN PATENT DOCUMENTS

| | | | |
|---|---|---|---|
| GB | 2403633 A | * | 1/2005 |
| JP | 2004-133806 | | 4/2004 |

* cited by examiner

Block diagram showing hardware configuration of programmable terminal device

Fig. 4
Screen
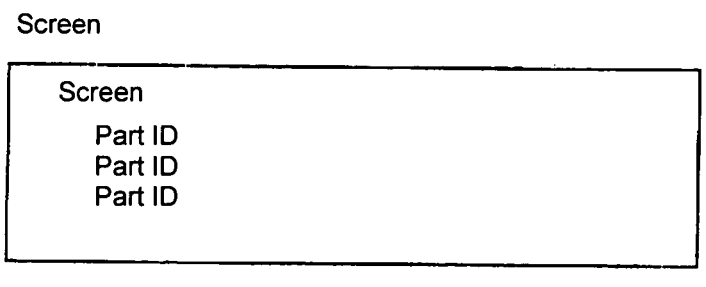
(a) Screen configuration defined using parts configuration information
Part
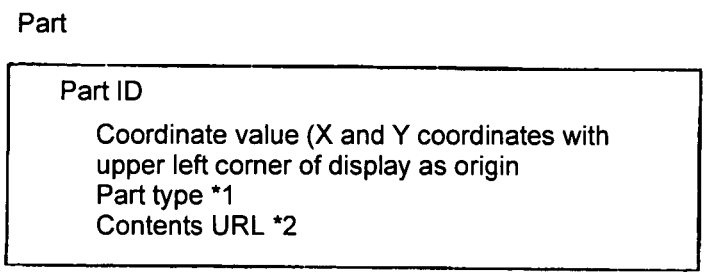
(b) Detailed parts configuration information
Diagram for explaining screen data file General flowchart showing operation of programmable terminal Detailed flowchart of one-screen plotting and display process Detailed flowchart indicating contents acquisition process Detailed flowchart showing data normal acquisition process Fig. 9
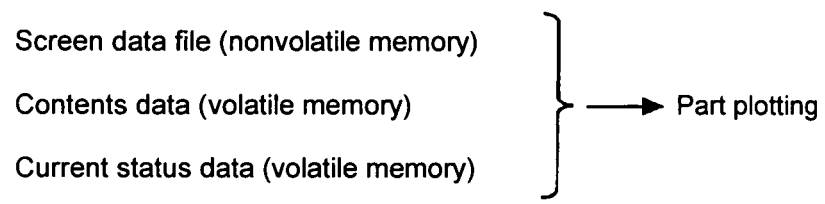
(a) Plotting of part designated by content
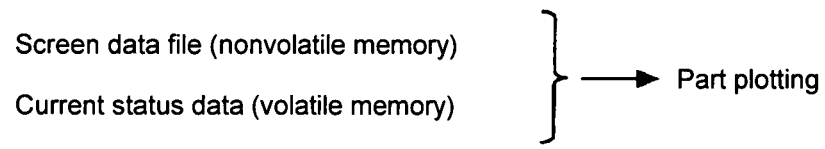
(b) Plotting part not designated by content
Diagram for explaining plotting process Flowchart part 1 showing PC server operation Flowchart part 2 showing PC server operation

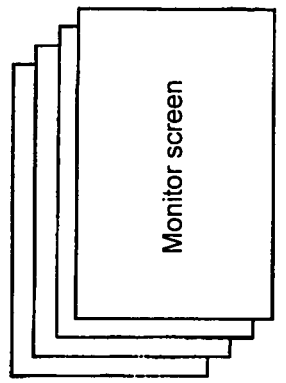
Fig. 12A Monitor screen
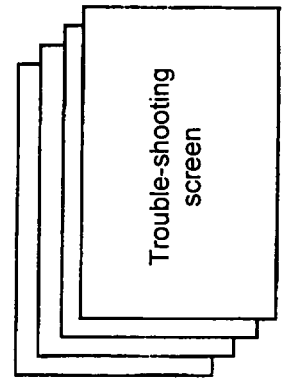
Fig. 12B Trouble-shooting screen
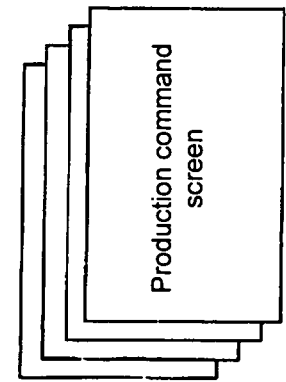
Fig. 12C Production command screen
Diagram for explaining type classification of display screens Diagram for explaining monitor screen example Diagram part 2 for explaining trouble-shooting screen example

PROGRAMMABLE TERMINAL SYSTEM

BACKGROUND OF THE INVENTION

1. Field of the Invention

This invention relates to a programmable terminal system comprising at least a programmable terminal device and a server device connected to each other through a network.

2. Description of the Related Art

In previously developed systems, a programmable terminal device (hereinafter referred to as the "PT") may be connected with a programmable logic controller (hereinafter referred to as the "PLC") and functions as a monitor (monitor device) for displaying the state of a device or a system to be controlled by the PLC. Also, the PT has a display screen in the form of a touch panel which is operated by the user to output a predetermined command to the PLC.

For this purpose, the monitor screen of the PT constitutes a display screen of a flat display panel with a large touch sensor, on which the state of the device to be controlled by the PLC is usually displayed. This monitor screen includes a background data displayed as a background of the monitor screen and figure data including various parts arranged and displayed on the background data. The parts of the figure data include an illustration figure corresponding to the device to be controlled (hereinafter referred to as the "object device"), a push-button switch figure for issuing an operation command to the object device and a display lamp figure indicating the operation status of the object device.

The image of the background displayed over the whole screen of the display panel is hereinafter called the "screen" and the various figures arranged and displayed on the screen are called the "parts". In what is called the multi-window control, however, the image corresponding to each of the windows (not necessarily enlarged over the whole screen) is called the "screen", and the information constituting the contents of the screen and the parts the "contents".

The PT and the PLC are connected communicably with each other. In the case where an input function part such as a push-button switch figure is operated through the touch panel by the user, a CPU making up the control unit of the PT applies an operation signal indicating (current status) to the PLC at an appropriate time to reflect the operation of the particular input function part in the physical unit of the PLC. In similar fashion, by changing the display status of any of the output function parts including various parts on the PT screen, the operation of a particular output function part is displayed on the screen. The parts may, for example, include a display lamp, an alarm lamp, a motor and a solenoid valve. The change in display occurs in operatively interlocked relation with the change in the control status of the PLC as the result of the CPU of the PT fetching the control status of the PLC.

In a more recently developed PT, in contrast, the display function is improved, so that not only the monitor screen for the PLC control status but also various screens including a trouble-shooting screen and a production command screen are adapted to be displayed by appropriately switching on the display screen. Some products placed on the market with the improved display function have as many as 4000 screens in total (see Japanese Patent Application No. 2004-133806).

The trouble-shooting screen is defined as a screen in which in case of trouble with the object device, for example, the job and the knowledge required for restoration are displayed in the form of a figure, a description or an illustration. The production command screen, on the other hand, is a screen in which production commands to the operator are displayed similarly in the form of a figure, a description or an illustration on a production line including the object device. These screens are often switched by the switching operation of the operator through the touch panel or an automatic switching process operatively interlocked with occurrence of a problem. The trouble-shooting screen and the production command screen are arranged on the background screen and therefore can be considered "parts". The repair work information, the knowledge, figures, description and the illustration displayed in the trouble-shooting screen may also be considered parts. The specifics such as the repair work and knowledge, the figures, the description and the illustration contained in each part correspond to the "contents".

The trouble-shooting screen and the production command screen are often used to display the accumulation of the production know-how and techniques with the contents data which are highly confidential information for the companies having the PT on the one hand and very useful information for the competitors on the other hand.

In the prior art, all the data required to plot the screen displayed on the display screen are usually stored in a nonvolatile memory (such as a flash memory or a hard disk) of the PT. Generally, the file management system of the nonvolatile memory is fixed in form and the data therein can be read out with comparative ease.

The conventional PT, therefore, poses the problem that the PT itself may be stolen or the data stored in the nonvolatile memory may be stolen by connecting a personal computer to the PT. As a result, the highly confidential information of the enterprise in which the PT is installed may be easily accessed.

Also, the production command screen must often be updated for securing the synchronization among a plurality of production lines. The data format required for plotting the screen, however, is analogous to the CAD unique to each PT, and therefore the data must be created by connecting a personal computer to each PT using an exclusive tool.

In the case where a PT is installed on each production line, therefore, for each update the bothersome job of creating or transferring the data using an exclusive tool must be repeated by connecting a personal computer to each PT.

In addition, the need of operating an exclusive image creation tool instead of a multipurpose OA software leads to the problem that a skilled operator is required to rewrite the data.

This invention has been achieved in view of the aforementioned problems of the conventional PT, and an object of the invention is to provide a PT system, a PT device and a method of managing the PT system in which the screen of arbitrary contents can be displayed on a display screen and the confidential contents can be protected from unauthorized access.

Another object of the invention is to provide a PT system, a PT device and a method of managing the PT system in which the data required to plot the screen can be rewritten without connecting a personal computer having an exclusive tool built therein to each PT.

Still another object of the invention is to provide a PT system, a PT device and a method of managing the PT system in which the data required to plot the screen can be rewritten without connecting a personal computer having an exclusive tool built therein to each PT, and in which multipurpose OA software can be used to rewrite the required contents.

The above and other objects, features and advantages will be easily understood by persons skilled in the art with reference to the following description.

SUMMARY OF THE INVENTION

A programmable terminal system according to the invention includes at least a programmable terminal device and a server device connected to each other through a network.

The programmable terminal device includes a display panel and a nonvolatile memory for storing a screen data file for a plurality of screen. A configuration is defined for each screen using parts configuration information for a plurality of parts included in a screen. The programmable terminal device may also include a volatile memory, a communication circuit connected to the network for communicating with the server device and a display screen determination part for determining the screen to be displayed. The determination may be made either by manual operation of a user or according to a preset display procedure. The PT may additionally include a screen display control part for displaying the corresponding screen on the display panel based on the screen data file stored in the nonvolatile memory and corresponding to the screen determined by the display screen determination part.

The part configuration information included in the screen data file is categorized into a groups. One group may correspond to a part including a content acquired from the server device and including storage location information of content data corresponding to the content in the server device. The other group corresponds to the part without the content.

In embodiments of the invention, the screen display control part includes a first display control part and a second display control part. The first display control part displays the part using the part configuration information included in the screen data file in the nonvolatile memory if the part configuration information read from the screen data file corresponds to the part without the content to be acquired from the server device. The second display control part transmits request command including a storage location information of the content data corresponding to the content in the server device to the server device through the communication circuit. The second display control part additionally stores the content data arriving as a response from the server device acquired through the communication circuit in the volatile memory. The second display control part displays the part using the content data stored in the volatile memory and the part configuration information included in the screen data file in the nonvolatile memory, if the part configuration information read from the screen data file corresponds to the part including the content acquired from the server device.

The server device includes a nonvolatile memory for storing the content data to be downloaded to the programmable terminal device and a communication circuit connected to the network for communicating with the programmable terminal device. The server device may additionally include a content data search part for searching the nonvolatile memory for the corresponding content data based on the storage location information included in the transmission request command in response to receiving the transmission request command transmitted from the programmable terminal device. The server device may additionally include a response transmission part for transmitting a search result by the content data search part to the programmable terminal device together with the response to the transmission request command through the communication circuit.

With this configuration, the parts having highly confidential contents can be discriminated when creating a screen data file. Also, as long as the parts configuration information including the storage position information of the contents data corresponding to the particular contents in the server device are created and the contents data corresponding to the confidential contents are stored in the corresponding storage position in the server device, the second plotting display control operates so that the contents data are automatically downloaded from the server device and acquired by and stored in the volatile memory. Subsequently, corresponding contents data are plotted and reproduced and displayed on the display screen together with the particular part.

The contents data stored in the volatile memory of the programmable terminal device are extinguished as soon as power is switched off, and therefore even in the case where the programmable terminal device is stolen, the contents data are not stolen. Further, the memory management system of the volatile memory employs a configuration unique to each computer system, and therefore, even in the case where power is on, the stored contents cannot be easily read out unlike in the nonvolatile memory.

The whole screen constituted of the parts including the highly confidential contents is not stored in the nonvolatile memory of the server device. Instead, the parts configuration information are combined to make up one screen while with regard to the parts containing the highly confidential contents, only the contents data corresponding to the particular contents are stored in the server device. Thus, all or almost all the parts data can be held in the programmable terminal device. As a result, the screen portion other than the portion including the highly confidential contents can be plotted immediately without being downloaded from the server device, thereby preventing the response of screen display as a whole from being adversely affected.

In the presence of a programmable terminal device for each production line, the terminal devices are connected through a network under a common server device. In this way, the highly confidential contents can be managed centrally by the server device, and the conventional complicated arrangement can be avoided in which a personal computer is connected to each programmable terminal device to rewrite the data.

As a result, according to this invention, a screen having arbitrary contents can be displayed on the display screen while at the same time positively preventing the highly confidential contents from leaking out.

According to a preferred embodiment of the invention, the content data stored in the nonvolatile memory of the server device is described in a data format for a general purpose OA software. The server device further includes a data format conversion part for converting the data format of the content data retrieved from the nonvolatile memory, from the data format for the general purpose OA software to the data format for the programmable terminal device before the response is transmitted to the programmable terminal device.

With this configuration, the highly confidential contents can be centrally managed by the server device, while the contents data can be created using the multipurpose OA software such as WORD (registered trade mark) or EXCEL (registered trade mark). Unlike in the prior art, therefore, even the contents creator (desk worker) having yet to master the data format of the programmable terminal device can create the contents data easily within a short period of time, and the configuration is very suitably applicable for generation of a production command screen, for example, which is frequently updated every day.

According to a preferred embodiment of the invention, the second display control part of the programmable terminal device may perform a function of checking the volatile memory for the corresponding content data before transmitting the transmission request command to the server device through the communication circuit when the corresponding content data exists in the volatile memory. The second display control part may also perform the function of extracting update information attached to the content data and inserting the update information in the transmission request command. The server device may include a mechanism for comparing the update information included in the transmission request command with update information attached to the content retrieved from the nonvolatile memory before transmitting the response to the programmable terminal device. When both types of update information are coincident with each other, the server device may prohibit a transmission of the retrieved content data to the programmable terminal device.

With this configuration, the operation of checking the update information on the part of the server device eliminates the need of repeatedly downloading the contents data already stored in the volatile memory of the programmable terminal device, thereby preventing the display response from being adversely affected by the otherwise wasteful downloading job. With regard to the operation of checking the update information on the part of the server device, however, the contents data of the server device may be downloaded only in when the contents data of the server device are newer than the contents data of the programmable terminal device.

According to a preferred embodiment of the invention, the second display control part of the programmable terminal device further includes a mechanism that performs a function of erasing the corresponding old content data from the volatile memory before storing the content data acquired as the response in the volatile memory.

With this configuration, the complicated coexistence of old and new contents data on the volatile memory of the programmable terminal device is avoided while at the same time saving the memory capacity.

According to another aspect of the invention, there is provided a programmable terminal device capable of receiving the contents data distributed from the server device through a network.

In embodiments of the invention, the programmable terminal device receives a content data distributed from a server device through a network and includes a display panel, and a nonvolatile memory for storing a screen data file for a plurality of screens. The screen data file defines a configuration for each screen using part configuration information for a plurality of parts included in a screen. The programmable terminal device may additionally include a volatile memory and a communication circuit connected to the network for communicating with the server device. The programmable terminal device may further include a display screen determining part for determining a screen to be displayed by a manual operation of a user or in accordance with a preset display procedure and a screen display control part for displaying the corresponding screen on the display panel based on the screen data file stored in the nonvolatile memory and corresponding to the screen determined by the display screen determining part.

The part configuration information included in the screen data file is categorized into a group corresponding to a part including content acquired from the server device and including storage location information of content data corresponding to the content in the server device. The part configuration information is also categorized another group corresponding to the part not including the content.

The screen display control includes a first display control part and a second display control part. The first display control part displays the part using the part configuration information included in the screen data file in the nonvolatile memory if the part configuration information read from the screen data file corresponds to the part without the content data acquired from the server device. The second display control part transmits a request command including the storage location information of the content data corresponding to the contents in the server device to the server device through the communication circuit. Additionally, the second display control part stores the content data arriving with a response from the server device in the volatile memory. The second display part displays the part using the content data stored in the volatile memory and the part configuration information included in the screen data file in the nonvolatile memory if the part configuration information read from the screen data file corresponds to the part including the content acquired from the server device.

With this configuration, there is provided a programmable terminal device suitable for the system according to the invention.

According to a preferred embodiment of the invention, in the programmable terminal device, the second display control part further a mechanism for performing a function of checking the volatile memory for the corresponding content data before transmitting the transmission request command to the server device through the communication circuit. When the corresponding content data exists in the volatile memory, the second display control part provides for extracting update information attached to the content data and inserting the update information in the transmission request command.

According to a preferred embodiment of the invention, in the programmable terminal device, the second display control part further includes a component for performing a function of erasing the corresponding old content data from the volatile memory before storing the content data acquired with the response in the volatile memory.

According to a preferred embodiment of the invention, in the programmable terminal device, the second display control part further includes functionality for displaying a predetermined error indication on the display panel when the response fails to arrive or the response indicates "data acquisition failure".

With this configuration, the failure to acquire the contents data can be immediately provided to the user of the programmable terminal device.

According to a preferred embodiment of the invention, in the programmable terminal device, the second display control part further includes functionality for skipping a process of storing the content data in the volatile memory when the response indicates "normal end without data".

With this configuration, in the case where the contents data in the programmable terminal device are identical with those in the server device, the wasteful downloading is avoided and the process can be immediately transferred to the contents plotting step.

According to still another aspect of the invention, there is provided a server device capable of distributing the contents data to each programmable terminal device through a network.

The server device having functionality for distributing a content data to at least a programmable terminal device through a network includes a nonvolatile memory storing content data to be downloaded to the programmable terminal device and a communication circuit connected to the network for communicating with the programmable terminal device. The server device may additionally include a content data search part for searching the nonvolatile memory for the corresponding content data based on storage location information included in a transmission request command in response to the transmission request command transmitted from the programmable terminal device and received through the communication circuit. The server device may also include a response transmission part for transmitting a search result from the content data search part to the programmable terminal device together with a response to the transmission request command through the communication circuit.

With this configuration, there is provided a server device suitable for the system according to the invention.

According to a preferred embodiment of the invention, there is provided a server device further including a data format conversion part for converting a data format of the content data retrieved from the nonvolatile memory, from the data format for the general purpose OA software to the data format for the programmable terminal device before being transmitted as the response to the programmable terminal device.

According to a preferred embodiment of the invention, there is provided a server device further comprising a comparing part for comparing update information included in the transmission request command with the update information attached to the content data retrieved from the nonvolatile memory before being transmitted with the response to the programmable terminal device. If the update information from both sources is the same, transmission of retrieved content data to the programmable terminal device will be prohibited.

According to a further aspect of the invention, there is provided a management method for the programmable terminal system including at least a programmable terminal device and a server device connected to each other through a network.

This management method for a programmable terminal system may utilize at least a programmable terminal device and a server device connected to each other through a network. The management method may be carried out with a nonvolatile memory and a volatile memory in the programmable terminal device and a nonvolatile memory in the server device. The method may include separating a plurality of screens adapted to be displayed on the programmable terminal device which include confidential content into confidential data for displaying a confidential content part of a screen and non-confidential data for displaying a remaining part. The management method may additionally include storing the non-confidential data in the nonvolatile memory of the programmable terminal device and the confidential data in the nonvolatile memory of the server device, the nonvolatile memory of the programmable terminal device further having stored therein a data indicating a storage location of the confidential data in the server device. The method may additionally include acquiring by downloading the confidential data based on the data indicating the storage location in the nonvolatile memory of the server device and storing the confidential data in the volatile memory of the programmable terminal device when the screen including the confidential content is displayed on a display panel of the programmable terminal device. The method may additionally include displaying the screen based on the non-confidential data stored in the nonvolatile memory of the programmable terminal device and the confidential data stored in the volatile memory of the programmable terminal device.

According to embodiments of this invention, there are provided a PT system, a PT device and a PT system management method capable of displaying a screen having arbitrary contents on a display screen and capable of positively preventing the confidential contents from undesired access.

BRIEF DESCRIPTION OF THE DRAWINGS

FIGS. 4A and 4B show diagrams for explaining a screen data file;

FIGS. 9A and 9B show diagrams for explaining the specifics of the plotting process;

FIGS. 12A-12C show a diagrams for explaining the type classification of the display screens;

DETAILED DESCRIPTION OF THE PREFERRED EMBODIMENTS

A programmable terminal system (PT system) according to a preferred embodiment of the invention is explained in detail below with reference to the accompanying drawings.

Figure 1:
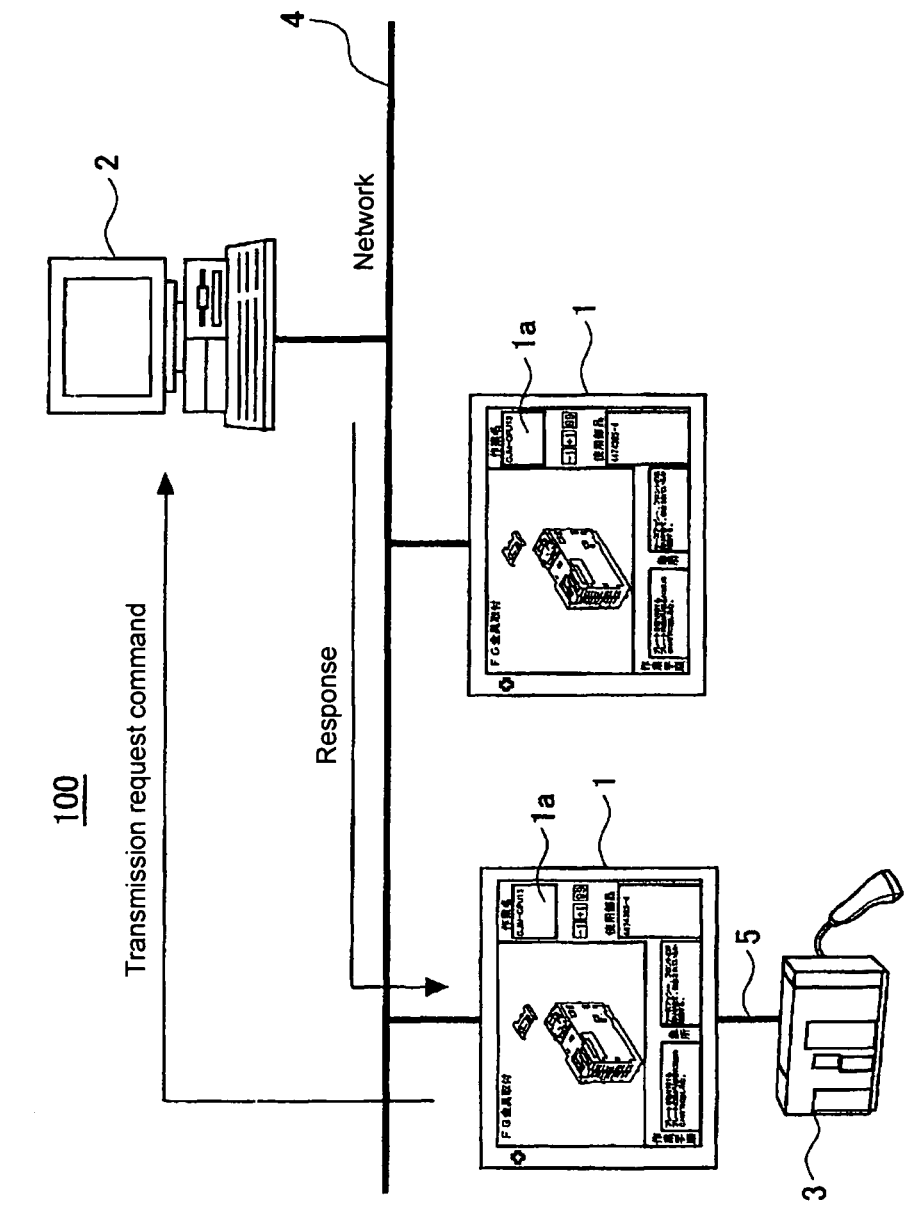
FIG. 1 shows a configuration of a programmable terminal system according to the invention.

The configuration of a PT system according to the invention is shown in FIG. 1. As shown in FIG. 1, the PT system 100 includes at least one PT devices 1, 1, . . . and a server device 2 connected to each other through a network 4. In the shown example, each PT device 1 is connected to a PLC 3 through the network 4. The network 4 may be Ethernet (registered trade mark), for example. A network 5, on the other hand, may include a field bus or a serial communication network, such as the FA network system.

As explained in detail later, the PT device 1 includes a touch display panel having a predetermined display screen 1a. The display panel may be specifically formed of a liquid crystal display, a plasma display or an organic EL display in this case.

Figure 2:
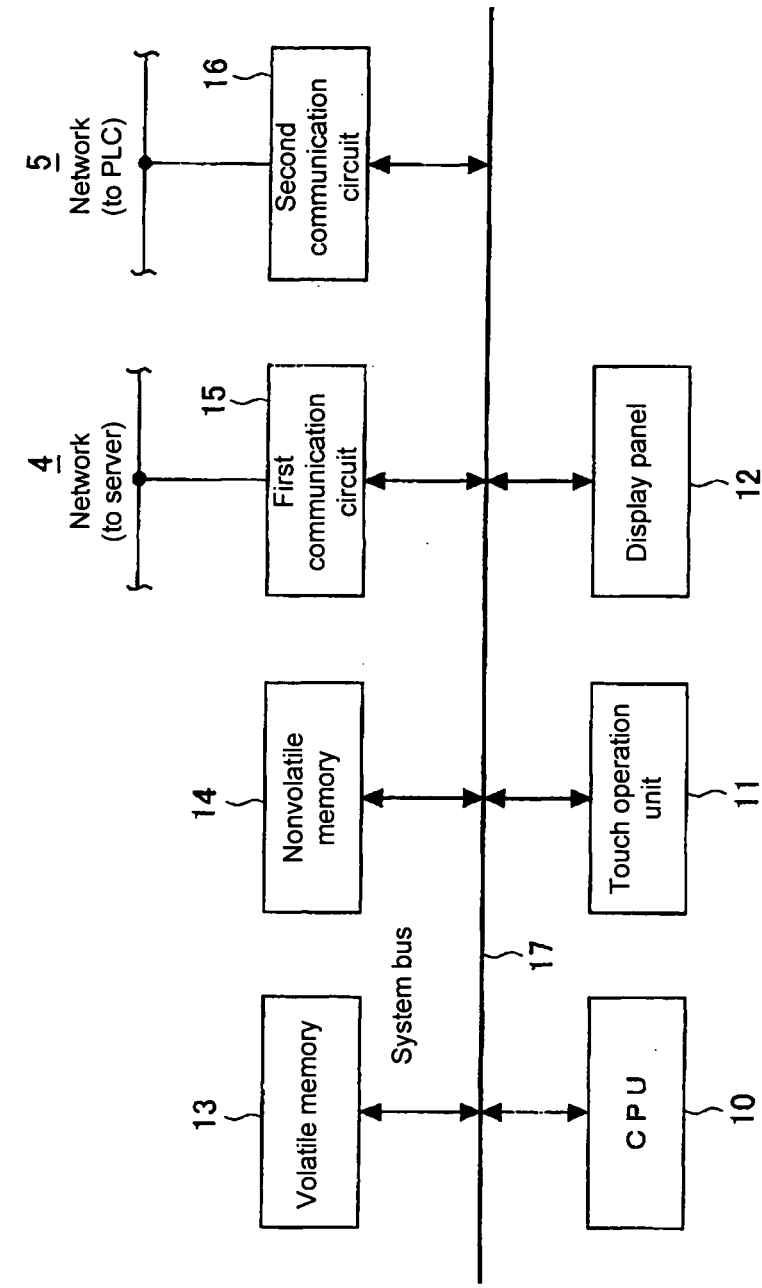
FIG. 2 shows a functional block diagram of the hardware configuration of a programmable terminal device.

A block diagram of a hardware configuration of the PT device is shown in FIG. 2. As shown in FIG. 2, the PT device 1 includes a CPU 10, a touch operation unit 11, a display panel 12, a volatile memory 13, a nonvolatile memory 14, a first communication circuit 15 and a second communication circuit 16.

The CPU 10, which includes a microprocessor, a ROM for storing a system program and a RAM used as a working area, controls the whole PT device integrally.

The touch operation unit 11 is arranged on the front surface of the display screen making up a display panel, and functions as an interface to detect the contact of the fingertip of the user or the like and fetch a corresponding signal.

The display panel 12 is made up of a liquid crystal display device, a plasma display device or an organic EL display device as described above. In the case under consideration, though not shown, the block defined by the display panel 12 includes a one-screen display buffer memory and a display controller for transferring the data read from the display buffer memory to a series of pixels of the display device.

The volatile memory 13, as described in detail later, is for storing the contents data and specifically may include a storage element such as DRAM.

The nonvolatile memory 14, also described in detail later, is for storing the screen data file, and specifically may include a flash memory or a hard disk.

The first communication circuit 15 is connected to the network 4 leading to the server device 2. The entire communication between the PT device 1 and the server device 2 is carried out through the first communication circuit 15.

In the shown example, the second communication circuit 16 is connected to the network 5 leading to the PLC 3, and the entire communication between the PT device 1 and the PLC 3 is carried out through the second communication circuit 16.

The component elements 10 to 16 of the PT device described above are connected to each other through a system bus 17.

Figure 3:
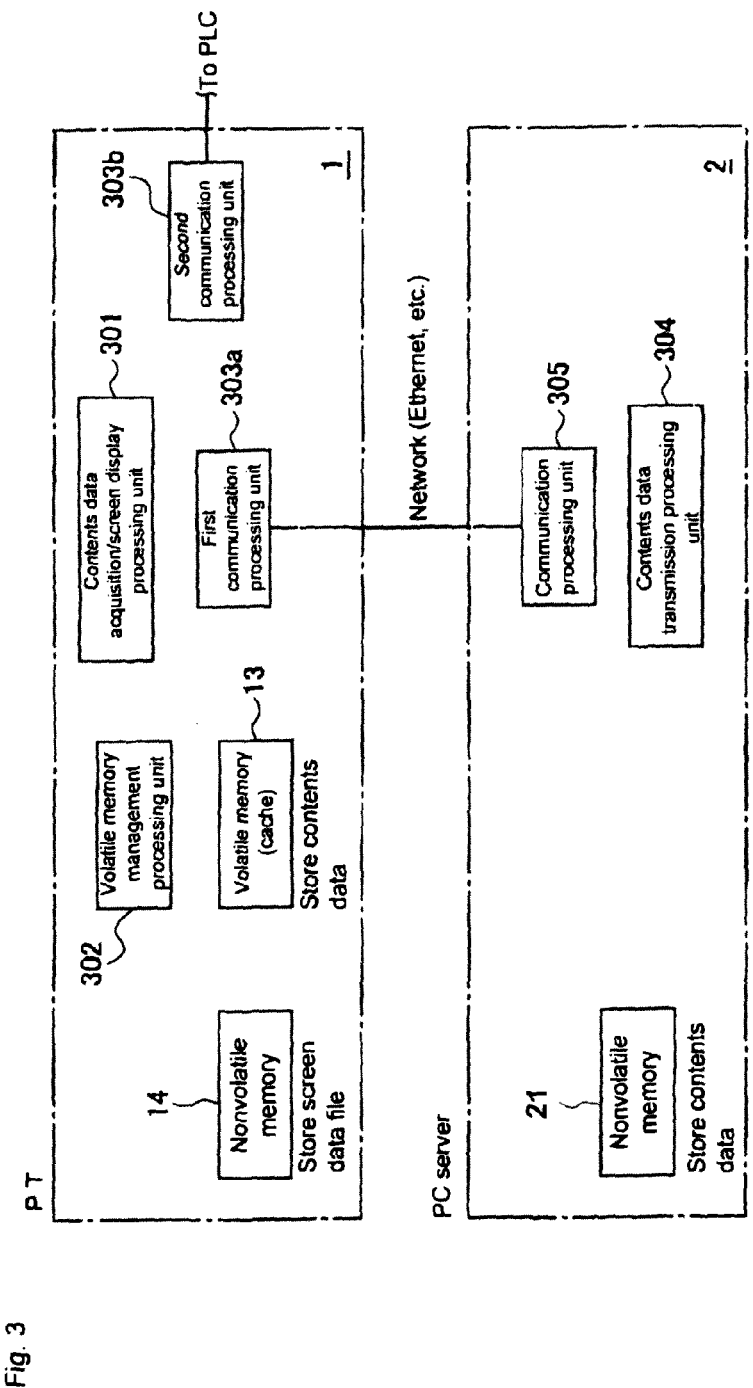
FIG. 3 shows a functional configuration of a programmable terminal system according to the invention.

The functional configuration of the PT system according to this invention is shown in FIG. 3. As shown in FIG. 3, several functional parts are virtually implemented by the operation of the CPU 10 in the PT device 1 and the server device 2. Specifically, the PT device 1 is configured of a contents data acquisition/screen display processing unit 301, a volatile memory management processing unit 302, a first communication processing unit 303a and a second communication processing unit 303b. In FIG. 3, reference numeral 13 designates the volatile memory, and numeral 14 the nonvolatile memory described above.

The contents data acquisition/screen display processing unit 301 reads the screen data file and in accordance with the parts information, implements the function of displaying the screen of a display unit. In the process, the contents data assigned to the part are acquired from the server device 2 in accordance with the contents URL.

The volatile memory management processing unit 302 has the function by which the contents data acquired from the server device 2 are stored in the volatile memory 13. The volatile memory management processing unit 302 has the function of executing the processes in which the data name of the contents data to be stored and the time stamp are managed, and the contents data are held in or erased from the volatile memory. Before holding the contents data in the volatile memory 13, the contents data of the same name, if existent in the volatile memory, are erased.

The first communication processing unit 303a is functionally configured to support the internet communication process capable of interpreting URL such as http and ftp.

The second communication processing unit 303b, as described above, is for implementing the communication with the PLC 3 through the network 5 and functionally configured to support the communication process such as through the field bus and the serial communication as is known in the art.

Next, the server device 2 in this example is implemented using a personal computer (hereinafter referred to as the PC). The server device 2 has arranged therein a nonvolatile memory 21 configured of a hard disk or the like, a contents data transmission processing unit 304 and a communication processing unit 305 implemented in software fashion.

The contents data transmission processing unit 304 is functionally configured in such a manner that the contents data of which the transmission is requested from the PT device 1 is acquired based on the URL thereof and returned to the PT device 1.

The communication processing unit 305 is functionally configured to support the internet communication process capable of interpreting the URL such as http and ftp.

The contents data acquisition/screen display processing unit 301 and the contents data transmission processing unit 304 combine to issue a request from the PT device 1, and in response to the request, the server device 2 acquires and transmits the contents data to the PT device 1, which receives it. In the process, either the contents data are transmitted one by one from the server device 2 to the PT device 1 (specifically described later with reference to a flowchart) or a plurality of contents URL existing in the screen data file are collectively transmitted to the server device 2 and a plurality of corresponding contents data are transmitted from the server device 2 to the PT device 1.

A diagram for explaining the screen data file is shown in FIG. 4. As described above, the nonvolatile memory 14 of the PT device 1 has stored therein a background screen data file and a parts screen data file corresponding to a maximum number (up to about 4000) of screens. As shown in FIG. 4A, each screen data file is discriminated by the screen ID. Also, in each screen data file, the screen configuration for one screen is defined by use of the parts configuration information of individual parts contained in the particular screen. As described in detail later, the screen is displayed by the PT device 1 in such a manner that the screen ID is delivered by switching the screen and the parts defined on the background screen of the screen ID are plotted sequentially. As shown in FIG. 4B, the parts configuration information is discriminated by the parts ID. In the shown example, the parts configuration information include the coordinate value (X-Y coordinate with the upper left corner of the display screen as an origin), the part type *1 and the contents URL *2.

The "part type *1" includes a figure, button, lamp, label, character string input/numerical value input, list selection, recipe, trend graph, alarm indication, graph indication or contents plotting.

The "contents URL *2" defines the method of acquiring the contents data required by the parts. Examples of the contents data acquired in this case include:
(1) the plotting data displayed on the surface of "button", "lamp" or "label";
(2) the plotting data displayed by "contents plotting";
(3) the character string list data (text data) displayed by "list selection"; and
(4) the data written in the PLC connected to the PT device by "recipe".

The format of the contents URL is defined by the description of URL widely used in the internet world, and in the case where the "http" procedure is used, for example, defined as "http://hmi.omron.co.jp/PC1/button01.bmp" assuming that the plotting data is "button01.bmp" existing under the server device (host name: hmi.omron.co.jp/PC1) on the network.

In the case where the plotting data is page 3 of "trouble•shoot02.doc" existing under the server device (host name: hmi.omron.co.jp/PC1) on the network, on the other hand, the format of the contents URL is defined as "http://hmi.omron.co.jp/PC1/trouble•shoot02.doc?page=3".

In another case where the character string list or the recipe data is "receipe03.csv" existing under the server device (host name: hmi.omron.co.jp/PC1) on the network, the format of the contents URL is defined as "http://hmi.omron.co.jp/PC1/recipe03.csv".

The PT device 1 has the function of plotting various contents data and files (such as the bmp file, jpeg file, CSV file, text file and the display screen data file) defined and acquired by the contents URL.

Further, the files created by other commercially available multipurpose applications (such as MSN/WORD (registered trade mark), EXCEL (registered trade mark), POWERPOINT (registered trade mark) file, CAD file, etc.) can be converted and displayed by being plotted on the display screen as far as the screen elements thereof can be decomposed into the parts and the files described above by part type *1.

Next, a general flowchart of the operation of the PT device 1 configured as described above is shown in FIG. 5. The process shown in this flowchart is activated by switching on power (power on).

Figure 5:
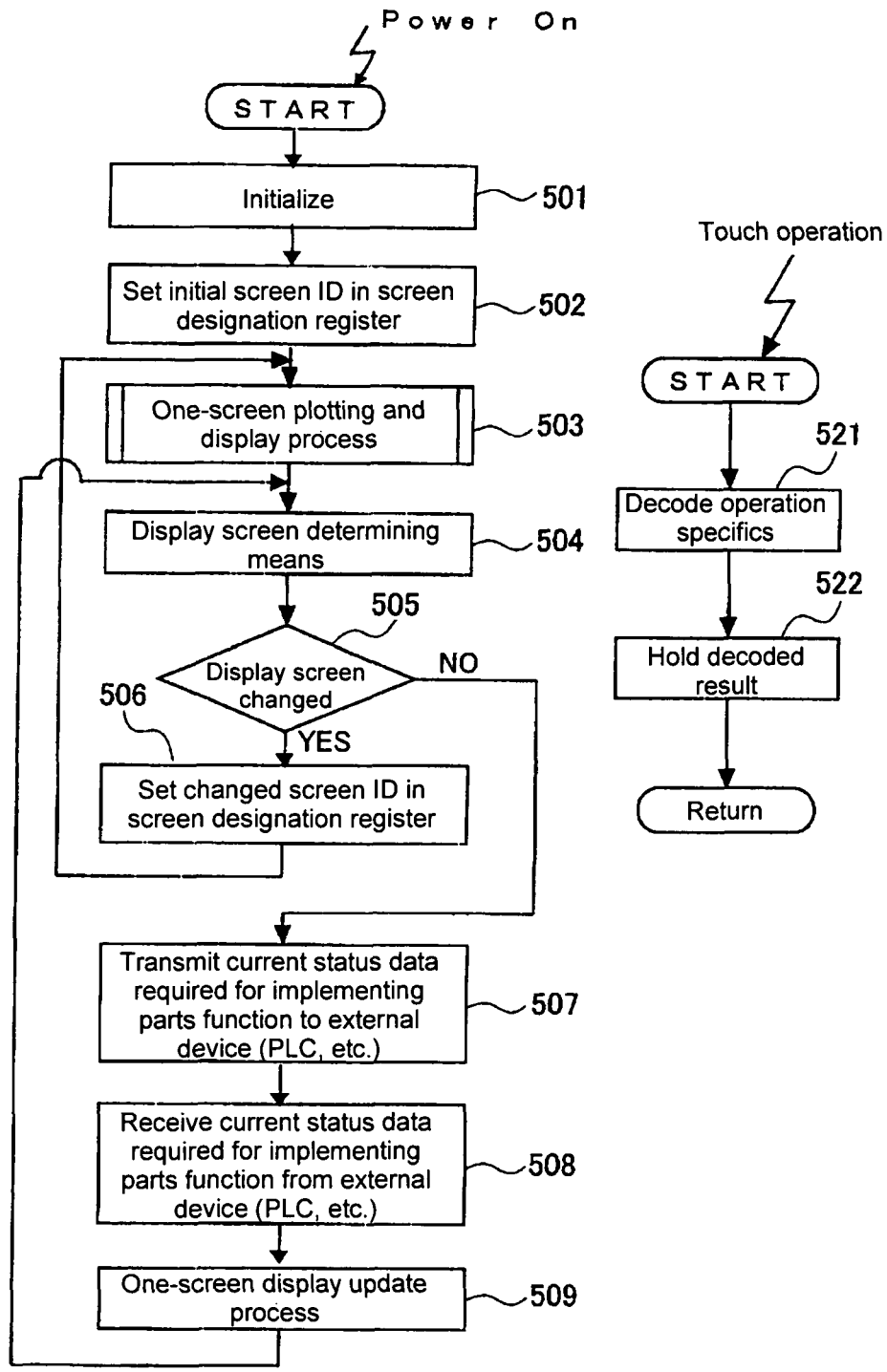
FIG. 5 shows a general flowchart of the operation of a programmable terminal.

Once the process is started in FIG. 5, the initialize process (step 501) is executed to initialize the register and the flag stored in the work memory of the CPU 10, after which the initial screen ID is set in a screen designation register (step 502). The screen designation register, though not shown, is set in the working area of the CPU 10, and by setting an arbitrary screen ID in this register, the plotting process and the display process are executed on the screen designated by the particular screen ID.

Then, the one-screen plotting and display process (step 503) is executed. In this process (step 503), the corresponding screen is displayed on the display screen 1a of the touch display panel of the PT device based on the screen data file stored in the nonvolatile memory 14 and corresponding to the screen ID set in the screen designation register. The one-screen plotting and display process (step 503) is explained in detail later with reference to FIGS. 6, 7.

Upon completion of the one-screen plotting and display process (step 503), the display screen determining process (step 504) is executed. In this display screen determining process (step 504), a screen to be displayed is determined by the manual operation of the user or in accordance with a preset display procedure. Specifically, the operation button such as "next" or "return" is displayed on the display screen 1a, and by touching these operation buttons, the screen to be displayed is determined in accordance with the procedure programmed in the PT device.

Based on the result of execution of the display screen determining process (step 504), it is determined whether the display screen is changed or not (step 505). Upon determination that the display screen is changed (YES at step 505), the screen ID of the display screen after the change is set in the screen designation register (step 506). This process changes the contents of the screen designation register described at step 502.

Then, the current status data required to implement the parts function is transmitted to an external device (such as the PLC) (step 507). This process is to notify the operation output of the various function buttons on the display screen 1a to the PLC 3.

Then, the current status data required to implement the parts function is received from the external device (such as the PLC) (step 508). This process is to reflect the actual value in the various indication lamps and the various measurement values on the display screen 1a.

In order to realize the process (steps 507, 508) for reflecting the current status, the interrupt process shown at the upper right portion in FIG. 5 is kept in operation. Specifically, when the user touches the display screen by fingertip or the like, the contents of the touch operation are decoded (step 521), and the decoding result is held in the work area in the CPU 10 (step 522). The contents of the operation thus held are accessed at step 507 to notify the current status from the PT device 1 to the PLC 3.

Figure 6:
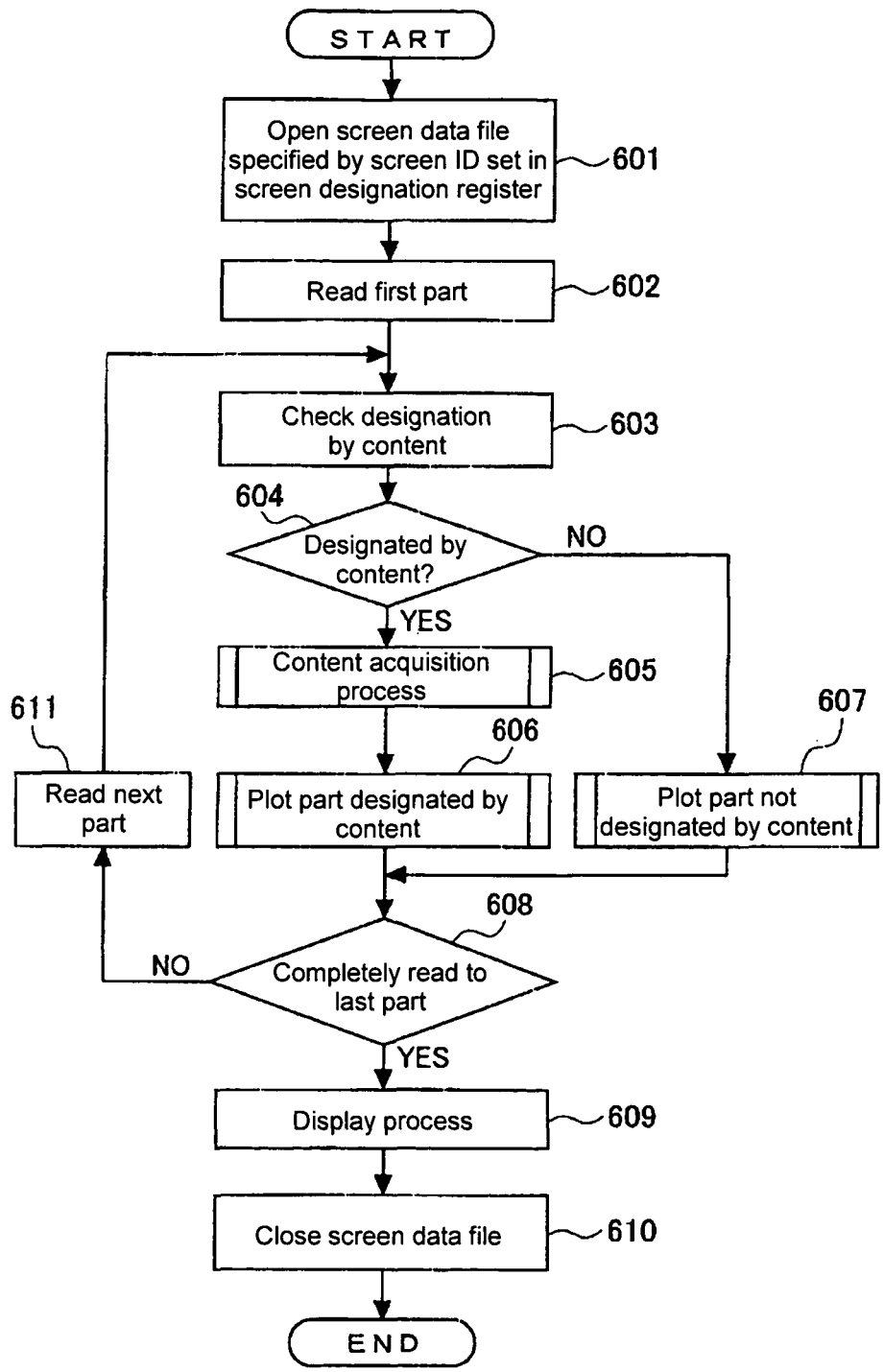
FIG. 6 shows a detailed flowchart of the plotting and display process for one screen.

Next, the detail of the one-screen plotting and display process (step 503) constituting the essential parts of the invention is shown in the flowchart of FIG. 6. Once the process is started in the flowchart, the screen data file designated by the screen ID set in the screen designation register is opened (step 601). As explained above, the screen data file is stored in the nonvolatile memory 14 of the PT device 1.

Then, the first part is read from the screen data file (step 602) and checked for designation or non-designation by content (step 603). The "designation by content" is defined as the act of designating the contents attached to the particular part by the contents in the server device 1.

Upon determination of the designation by content (YES at step 604), the process of acquiring the particular contents is executed (step 605) and the part associated with the designation by content is plotted (step 606). Upon determination of non-designation by content (NO at step 604), on the other hand, the contents acquisition process (step 605) is skipped and the process of plotting the part of non-designation by content is executed (step 607) immediately.

Figure 7:
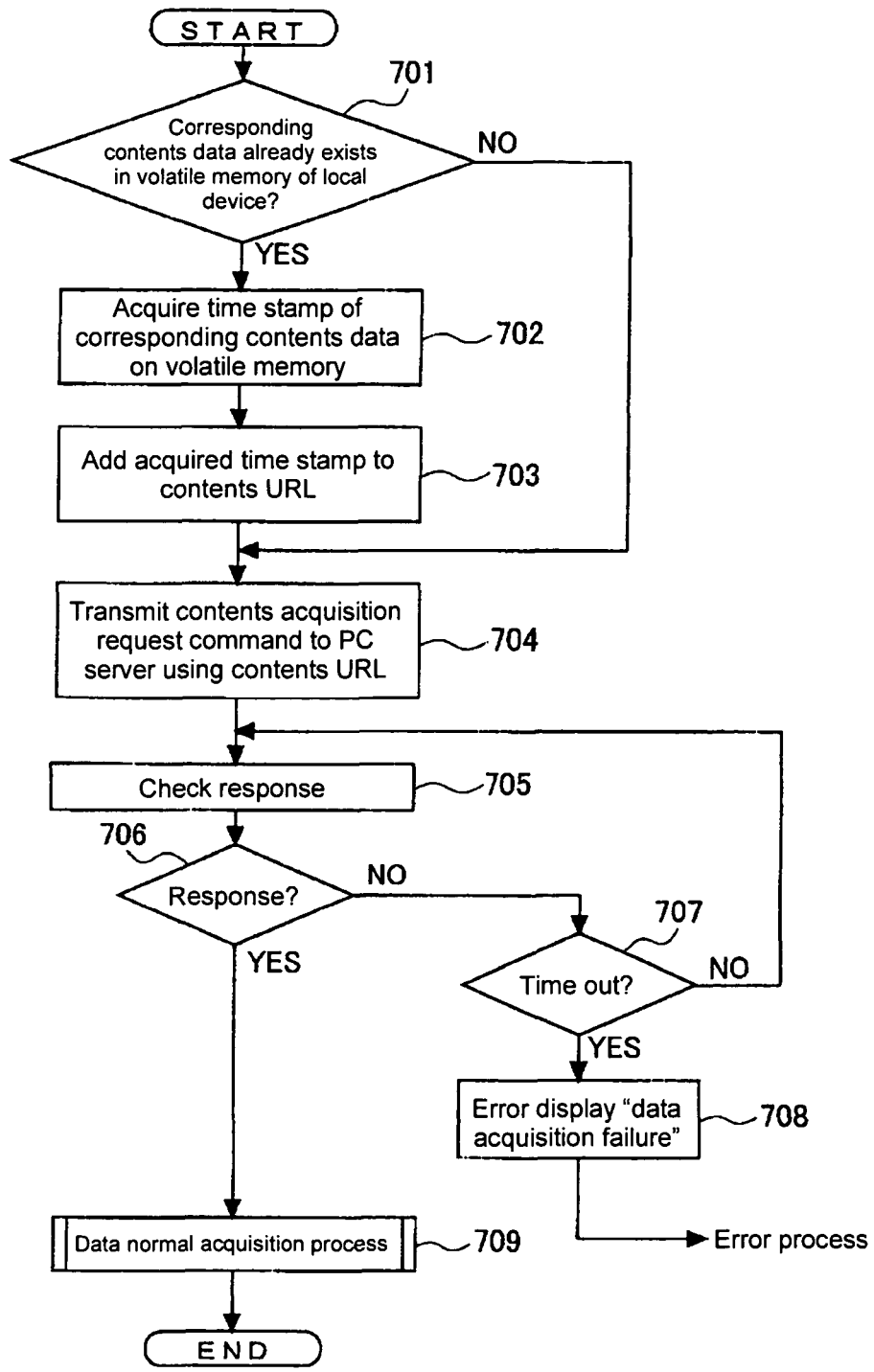
FIG. 7 shows a detailed flowchart of the process executed for acquiring the contents.

The contents acquisition process (step 605) is shown in detail in the flowchart of FIG. 7. Once the process is started in the flowchart, it is determined whether the corresponding contents data exists in the volatile memory 13 of the local device or not (step 701). In the case where the corresponding contents data exists in the volatile memory 13 of the local device (YES at step 701), the time stamp of the corresponding contents data on the volatile memory 13 is acquired (step 702), and the acquired time stamp is added to the contents URL (step 703). In the case where there exists no corresponding contents data in the volatile memory of the local device (NO at step 701), on the other hand, the process (steps 702, 703) is skipped.

Then, a contents distribution request command is transmitted to the PC server (server device) using the contents URL (step 704). As a result, the contents distribution request command with the time stamp added thereto is transmitted to the network 4 through the first communication circuit 15, after which the process proceeds to the standby mode waiting for the arrival of a response.

In the standby mode, the response is checked (step 705) while at the same time confirming the arrival or non-arrival thereof (step 706) and the time out (step 707). In the case where the expiry of the predetermined time is confirmed during the standby mode for the response (YES at step 707), the error indication "data acquisition failure" is displayed on the display screen 1a (step 708).

Upon determination of the arrival of a response (YES at step 706), on the other hand, the process for normally acquiring the data (data normal acquisition process) is executed (step 709).

Figure 8:
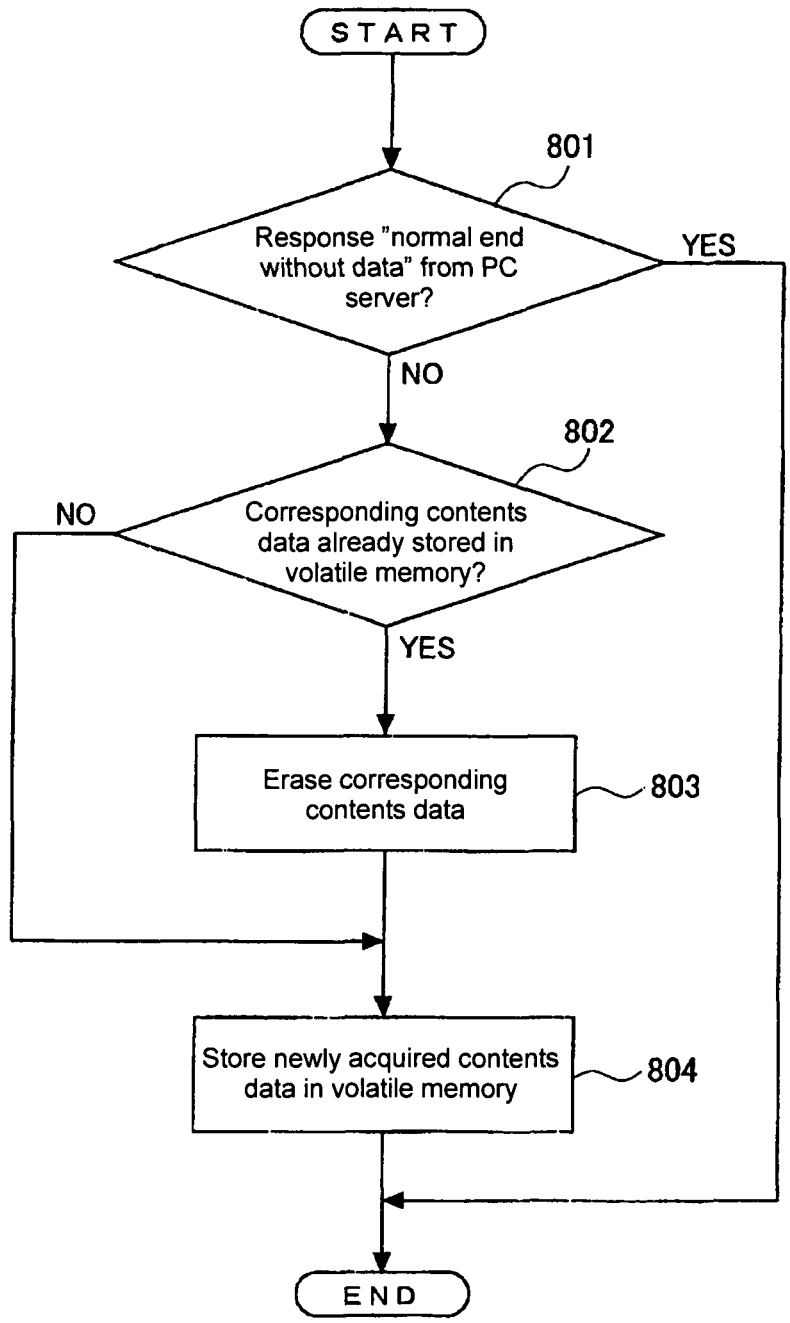
FIG. 8 shows a detailed flowchart of the process executed for normally acquiring the data.

A detailed flowchart of the data normal acquisition process is shown in FIG. 8. Once the process is started in FIG. 8, it is determined whether the response from the PC server (server device) is indicative of "normal end without data" or not (step 801). Upon determination of "normal end without data" (YES at step 801), the process is ended without executing the data normal acquisition process (step 709).

In the case where the response from the PC server is not the "normal end without data" (NO at step 801), on the other hand, it is further determined whether the corresponding contents data is already stored in the volatile memory 13 or not (step 802). Upon determination that the corresponding contents data is already stored (YES at step 802), the corresponding contents data is erased (step 803), and the newly acquired contents data is stored in the volatile memory (step 804).

Specifically, in executing the normal data acquisition process, it is assumed that the contents data of which transmission is requested from the PT device are already transmitted from the server device 2 to the PT device 1. The PT device 1 uses the contents data stored in the volatile memory 13 thereof as it is. In the case where the contents data stored in the server device are newer than the contents data of which transmission is requested from the PT device, on the other hand, the particular newer contents data are acquired based on the response of the server device, and after erasing the old contents data are stored anew in the volatile memory 13.

Returning to FIG. 6, the process of plotting the part designated by content (step 606) and the process of plotting the part not designated by content (step 607) are explained.

Upon execution of the process (step 606) of plotting the part designated by content, following the contents acquisition process (step 605), as shown in FIG. 9A, the part is plotted based on the screen data file, the contents data and the current status data (as required). The screen data file is defined as the corresponding parts configuration information in the screen data file. Also, the contents data are defined as those stored in the volatile memory 13 after being downloaded from the server device 2. Further, the current status data are defined as both those held at step 522 and those received from the PLC, etc. at step 508 in the flowchart of FIG. 5.

As described above, as for the part designated by content, it is plotted using the data downloaded from the server device 2 and stored in the volatile memory 13 as well as the data stored in the nonvolatile memory 14 of the PT device. The "plotting process" is defined as the process of plotting a corresponding sentence or figure in accordance with the designated language in the plotting area formed in the working memory or the volatile memory 13 in the CPU 10.

After that, the next part is read (step 611) and the aforementioned process is executed (steps 603 to 607). This series of process is repeatedly executed until the determination that the last part has been read (NO at step 608), and upon determination that the last part has been read (YES at step 608), the process transfers to the display process (step 609).

In the display process (step 609), the image formed in the plotting area in the CPU 10 or the volatile memory 13 is transferred to the display buffer area included in the display panel 12, so that by the operation of the display controller included in the display panel 12, the corresponding screen is displayed on the display screen 1a.

Then, the screen data file is closed (step 610), after which the process returns to FIG. 5 and transfers to the display screen determining process (step 504) described above.

Figure 10:
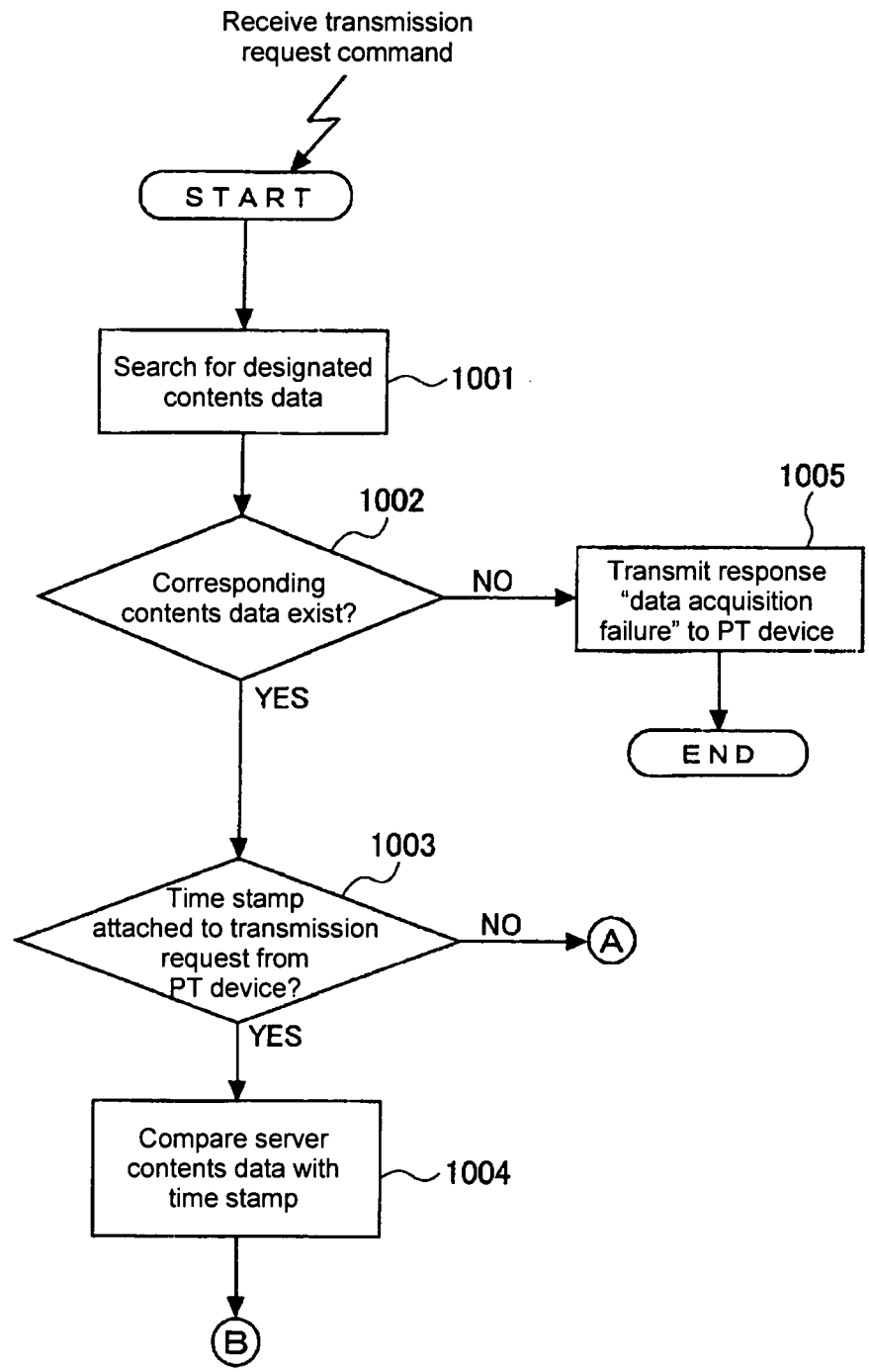
FIG. 10 shows part one of a flowchart displaying the operation of a PC server.
Figure 11:
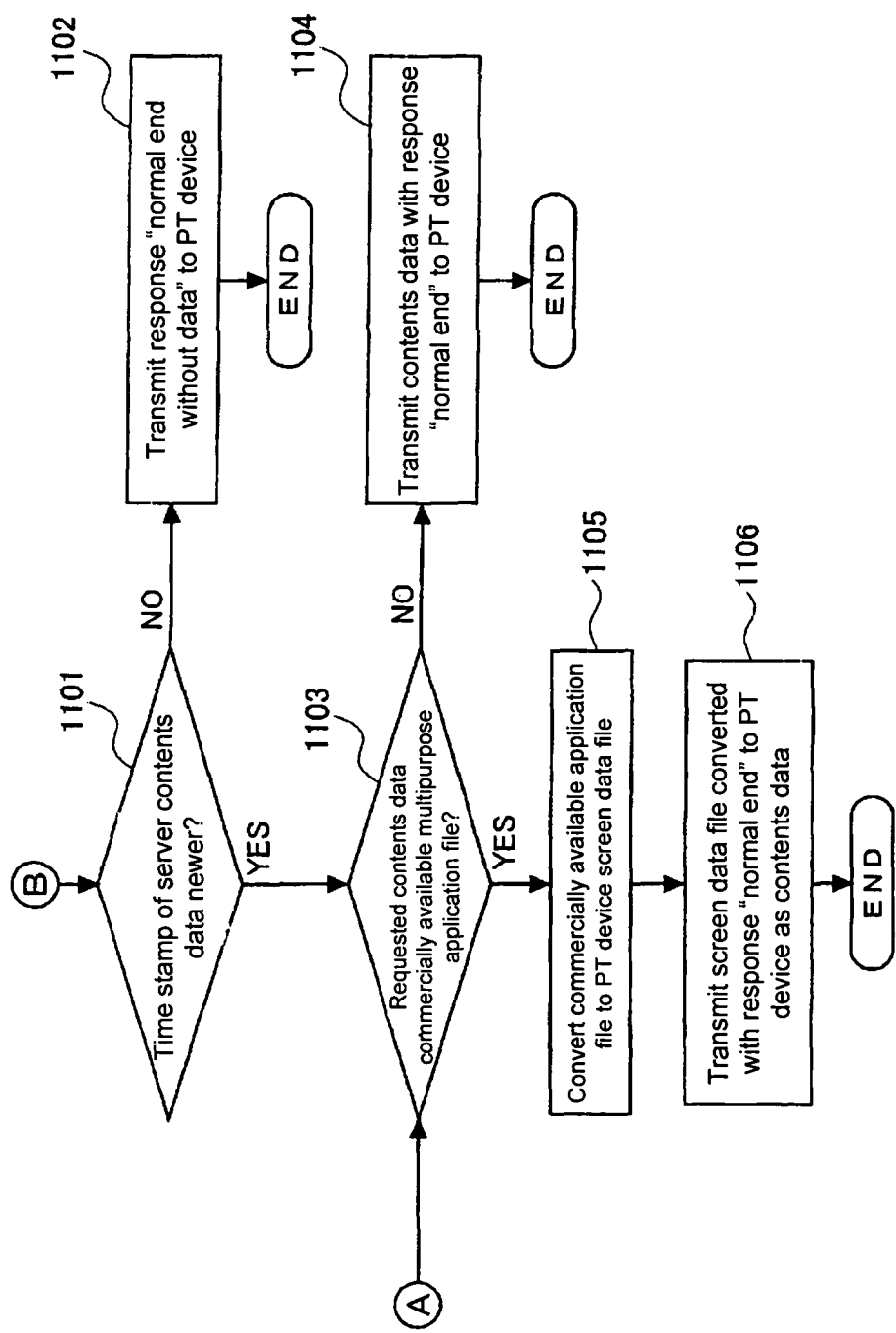
FIG. 11 shows part two of a flowchart displaying the operation of the PC server.

A first flowchart of the operation of the PC server (server device) is shown in FIG. 10, and a second flowchart thereof in FIG. 11.

The process shown in FIG. 10 is started by receiving a transmission request command. In FIG. 10, assume that the process is started. Based on the URL attached to the transmission request command received, the process of searching the nonvolatile memory 21 of the local device for the designated contents data is executed (step 1001).

Upon determination that the corresponding contents data are not existent in the nonvolatile memory 21 of the local device as the result of this search (NO at step 1002), a response indicative of "data acquisition failure" is transmitted to the PT device 1 (step 1005).

In the case where the corresponding contents data exists in the nonvolatile memory 21 (YES at step 1002) and a time stamp is attached to the transmission request from the PT device 1 (YES at step 1003), on the other hand, the time stamp received from the PT device 1 is compared with the time stamp attached to the contents data of the server (step 1004).

Upon determination that the time stamp of the contents data of the server is newer than the time stamp sent from the PT device (YES at step 1101), it is further determined whether the requested contents data is in the data format of a commercially available multipurpose application (step 1003). Upon determination that the file has the data format of a commercially available multipurpose application (YES at step 1103), the data format of the file of the commercially available multipurpose application is converted to the data format of the screen data file of the PT device (step 1105), after which the converted screen data file is transmitted as contents data to the PT device together with the response "normal end" (step 1006).

In the case where the time stamp of the contents data of the server is contemporary with or older than the time stamp sent from the PT device (NO at step 1101), on the other hand, a response indicating "normal end without data" is transmitted to the PT device (step 1102).

The requested contents data, if not a file having the data format of the commercially available multipurpose application (NO at step 1103), is transmitted as it is together with a response indicating "normal end" to the PT device (step 1104).

Further, in the case where the transmission request from the PT device has no time stamp (NO at step 1103), the time determination process is entirely skipped and the process immediately proceeds to step 1103 to determine the data format of the contents data.

As described above, the PC server (server device), in response to the arrival of a transmission request command from the PT device, searches the nonvolatile memory 21 thereof for the corresponding contents data based on the URL attached to the transmission request command, and after converting the retrieved contents data to the screen data file of the PT device, returns them as a response to the PT device. The availability of the data format conversion process (step 1105) makes it possible to employ the data format of the commercially available multipurpose OA software directly as the data format of the contents data stored in the nonvolatile memory 21 of the server device 2. As a result, the user or the manager in charge of generating the screen data requiring frequent updating such as the trouble-shooting screen or the production command screen is required to have the knowledge of only the commercially available OA software and not required to be versed in the data format of the programmable terminal device required for the PT device, thereby remarkably improving the operability.

Now, a method of management of the PT system including the PT device 1 and the server device 2 connected to each other through the network 4 is explained. In short, this management method is such that the PT device 1 includes both the nonvolatile memory 14 and the volatile memory 13, while the server device 2 includes only the nonvolatile memory 21. With regard to that screen capable of being displayed on the PT device 1 which includes the confidential contents, the confidential contents portion of the screen is separated into the confidential data for plotting the confidential contents portion and the non-confidential data for plotting the remaining portions of the screen. The non-confidential portion is stored in the nonvolatile memory 14 of the PT device, while the confidential data is stored in the nonvolatile memory 21 of the server device 2. Further, the nonvolatile memory 14 of the PT device has stored therein the data indicating the storage position of the confidential data in the server device 2. In the case where the screen including the confidential contents is displayed on the display screen 1a of the PT device, the confidential data is acquired by being downloaded from the server device 2 based on the data indicating the storage position in the nonvolatile memory 21 of the server device 2, and stored in the volatile memory 13 of the PT device. After that, an intended screen is plotted and displayed based on the non-confidential data stored in the nonvolatile memory 14 and the confidential data portion stored in the volatile memory 13 of the PT device.

A diagram for explaining the type classification of the display screens is shown in FIGS. 12A-12C. As shown in FIGS. 12A-12C, the screen data file corresponding to a maximum of about 4000 screens is stored in the nonvolatile memory 14 of the PT device 1. These screens, as shown in FIGS. 12A to 12C, for example, are classified into the monitor screen, trouble-shooting screen and the production command screen.

A confidential contents portion and a non-confidential portion coexist in these screens. In an application of the invention, therefore, the contents portion considered confidential is stored in the server device 2, while the non-confidential contents portion is stored in the PT device 1.

The manner in which the contents portion included in some examples of screens is handled is explained below.

Figure 13:
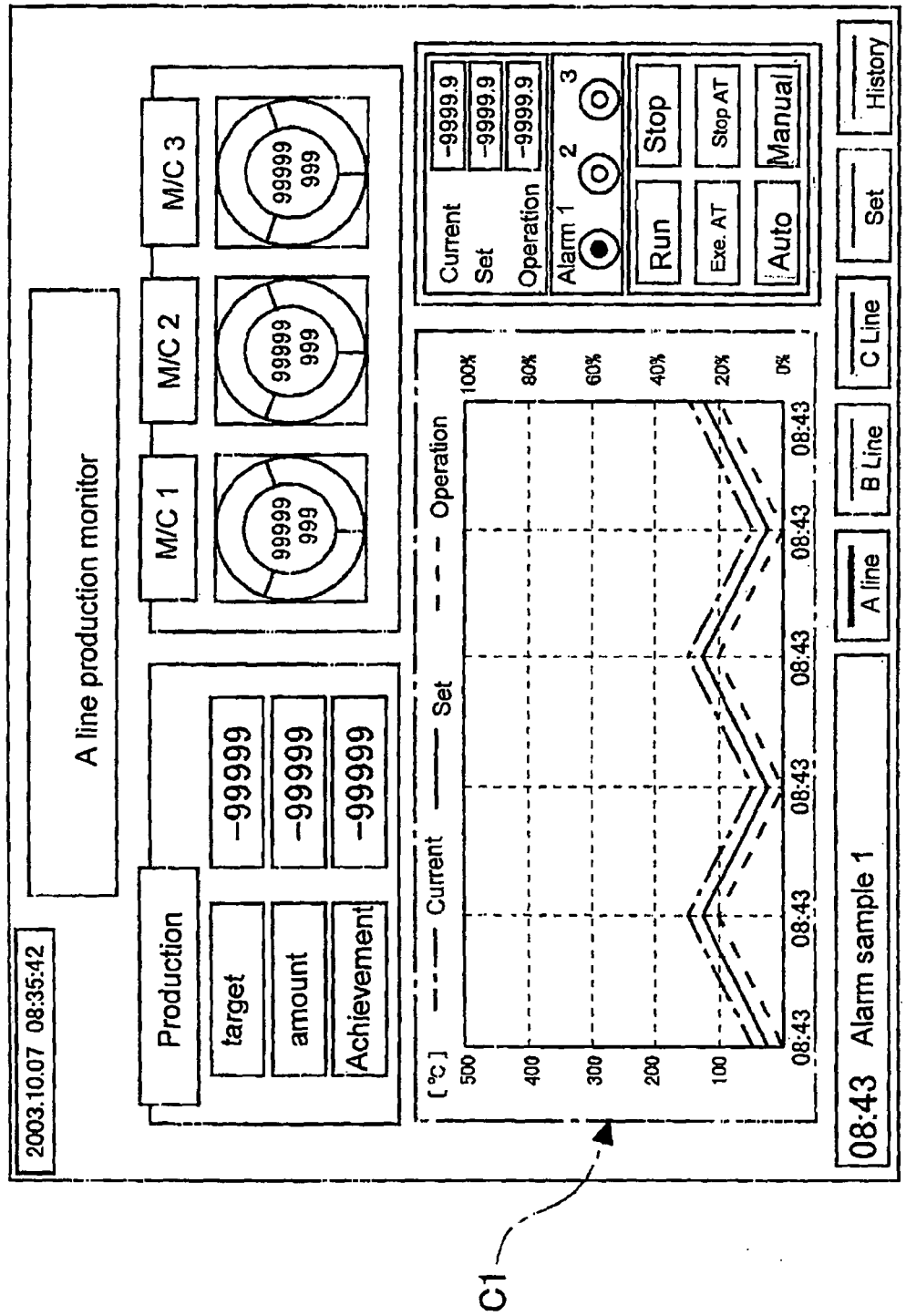
FIG. 13 shows a diagram for explaining an example of the monitor screen.

A diagram for explaining an example of the monitor screen is shown in FIG. 13. As shown in FIG. 13, the rectangular area defined by a one-dot chain in the monitor screen corresponds to the parts screen including the contents portion C1. The contents portion C1 is a parts screen arranged and displayed on the base screen constituting the background, and a graphic representation of the relation between the current value, the set value and the operation amount in what is called the PID control, in which time is plotted along the abscissa and temperature along the ordinate. In the case where the lapse of time in this PID control has a crucial meaning in the first process, the contents portion C1 is confidential information and can be stored in the server device 2 as contents. In this example, the contents C1 are considered not confidential and stored in the PT device 1.

Figure 14:
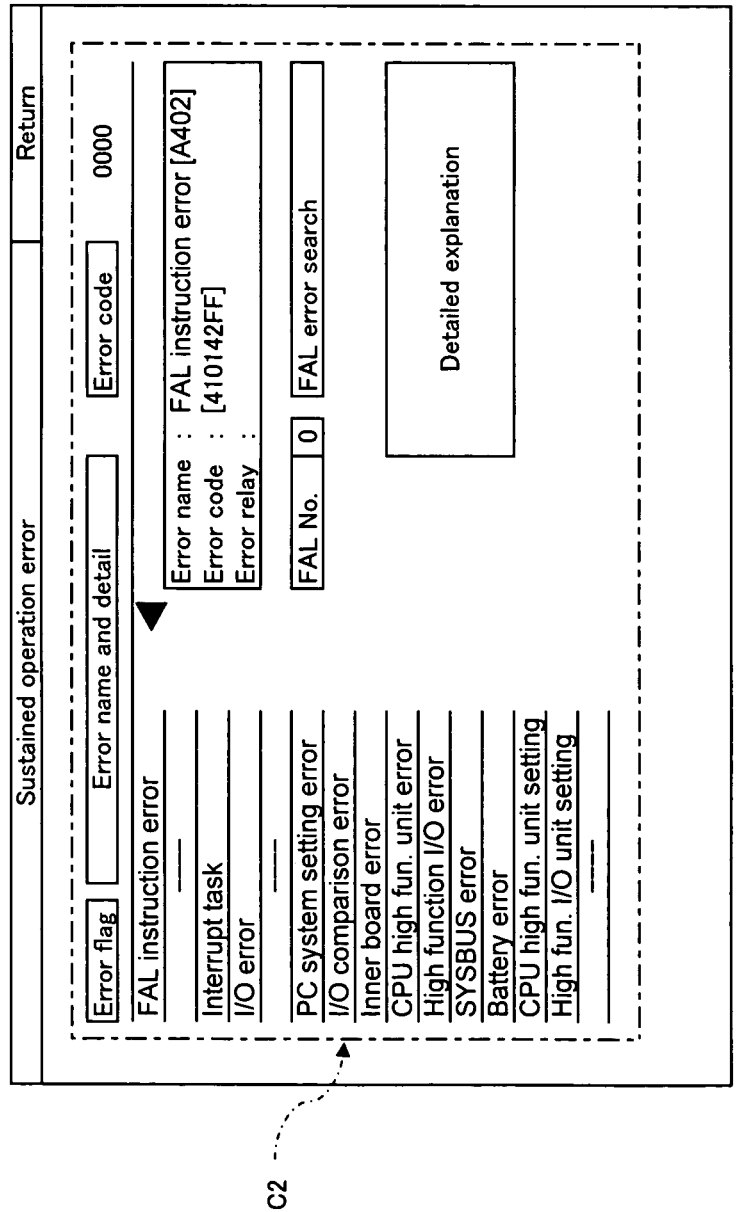
FIG. 14 shows part one of a diagram for explaining an example of the trouble-shooting screen.

A first diagram for explaining an example of the trouble-shooting screen is shown in FIG. 14. As shown in FIG. 14, a parts screen including the contents portion C2 defined by the one-dot chain is arranged and displayed on the base screen constituting the background. These contents are shown as a table relating an abnormality flag, an abnormality name and detail and an abnormality code to each other. For some PT device users, this detailed information on the abnormality flag may be regarded as confidential contents. In the example under consideration, however, the contents portion C2 is not considered confidential and is therefore stored in the PT device 1.

Figure 15:
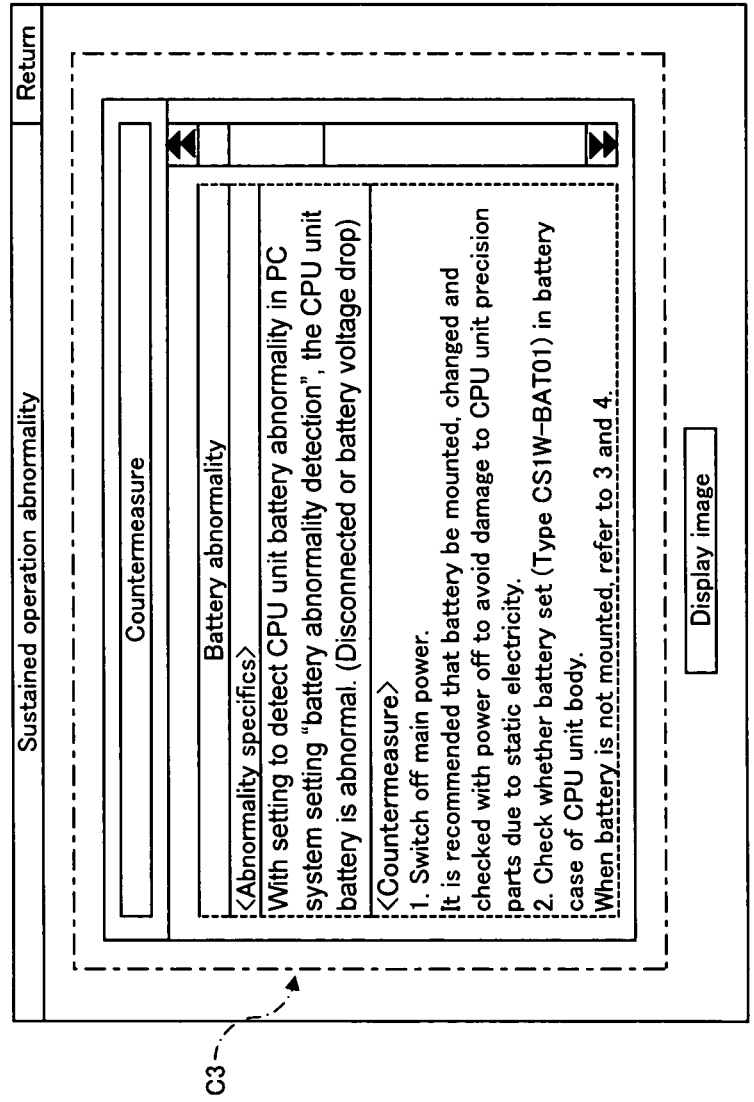
FIG. 15 shows a diagram part two for explaining an example of the trouble-shooting screen.

A second diagram for explaining an example of the trouble-shooting screen is shown in FIG. 15. As shown in FIG. 15, a parts screen including the contents portion C3 defined by the one-dot chain is arranged and displayed on the background screen. This contents portion C3 displays the description of the "detail" of and the "countermeasure" against what is considered as a "battery abnormality". In fact, these contents are an important know-how for an enterprise having a PT device, and the trouble-shooting time may be considerably affected according to whether this information is known or not. In the example under consideration, therefore, the contents portion C3 is determined as confidential, and the data corresponding to the contents portion C3 are stored in the server device 2 but not in the PT device 1.

Figure 16:
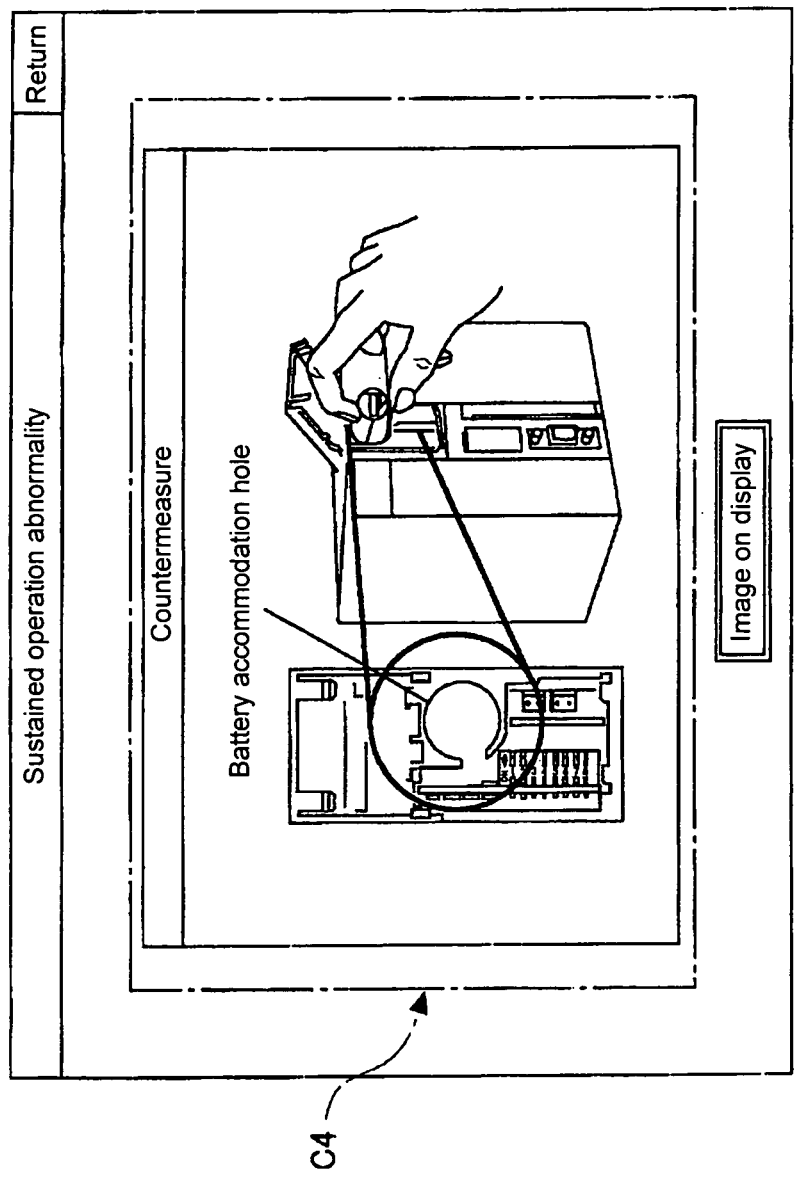
FIG. 16 shows a diagram part three for explaining an example of the trouble-shooting screen.

A third diagram for explaining an example of the trouble-shooting screen is shown in FIG. 16. In this trouble-shooting screen, a parts screen including the contents portion C4 defined by the one-dot chain is arranged and displayed on the background screen. This contents portion C4 is an illustrative presentation of a countermeasure against a battery abnormality, and like the aforementioned contents, includes an important know-how or the like and is regarded as confidential contents. As a result, the contents portion C4 is also stored in the server device 2 but not in the PT device 1.

Figure 17:
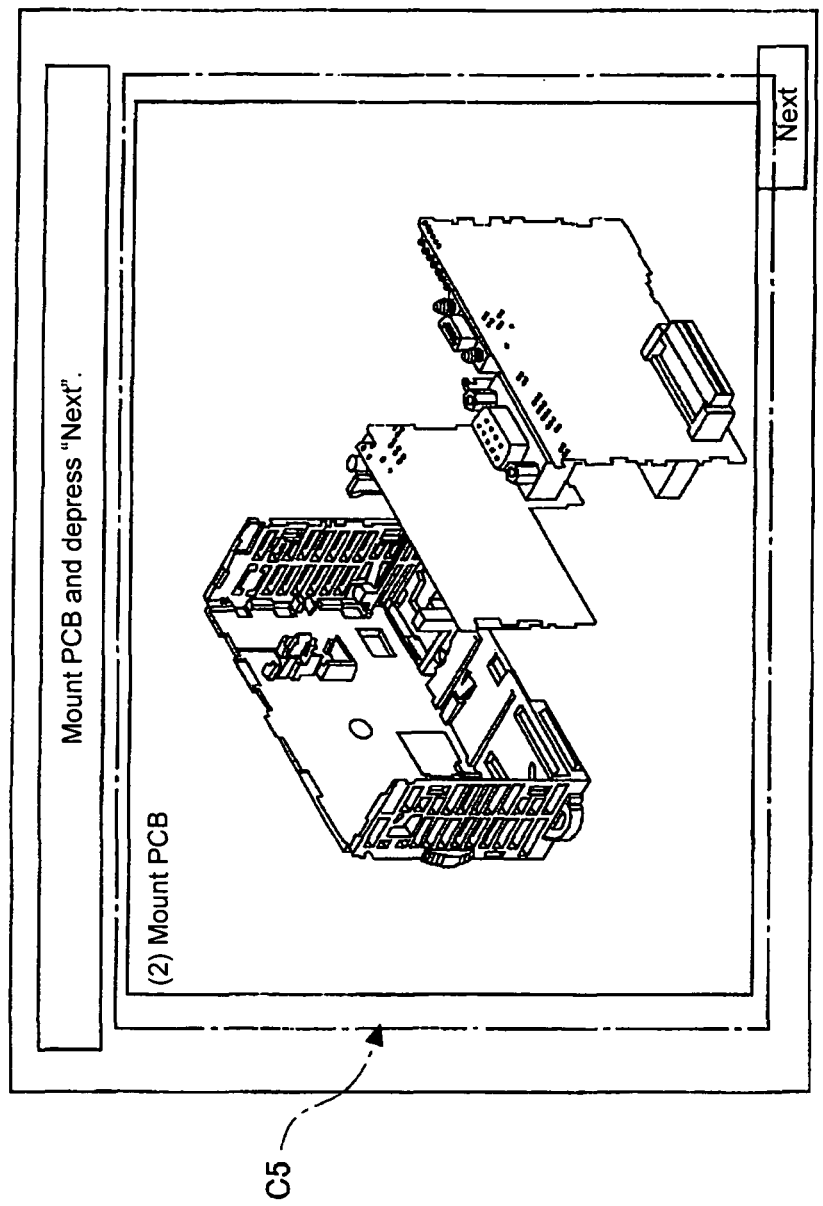
FIG. 17 shows part one of a diagram for explaining an example of the production command screen.

A first diagram for explaining an example of the production command screen is shown in FIG. 17. In this production command screen, a parts screen including the contents portion C5 defined by the one-dot chain is arranged and displayed on the background screen. This contents portion C5 is intended to teach the operator about the procedure for assembling a housing of a sort of an electronic device using a perspective illustration. This contents data is truly the information on the production technology constituting a crucial know-how, and should this contents portion be stolen, therefore, the enterprise involved would be damaged considerably. These contents, therefore, are regarded as confidential and stored not in the PT device 1 but in the server device 2.

Figure 18:
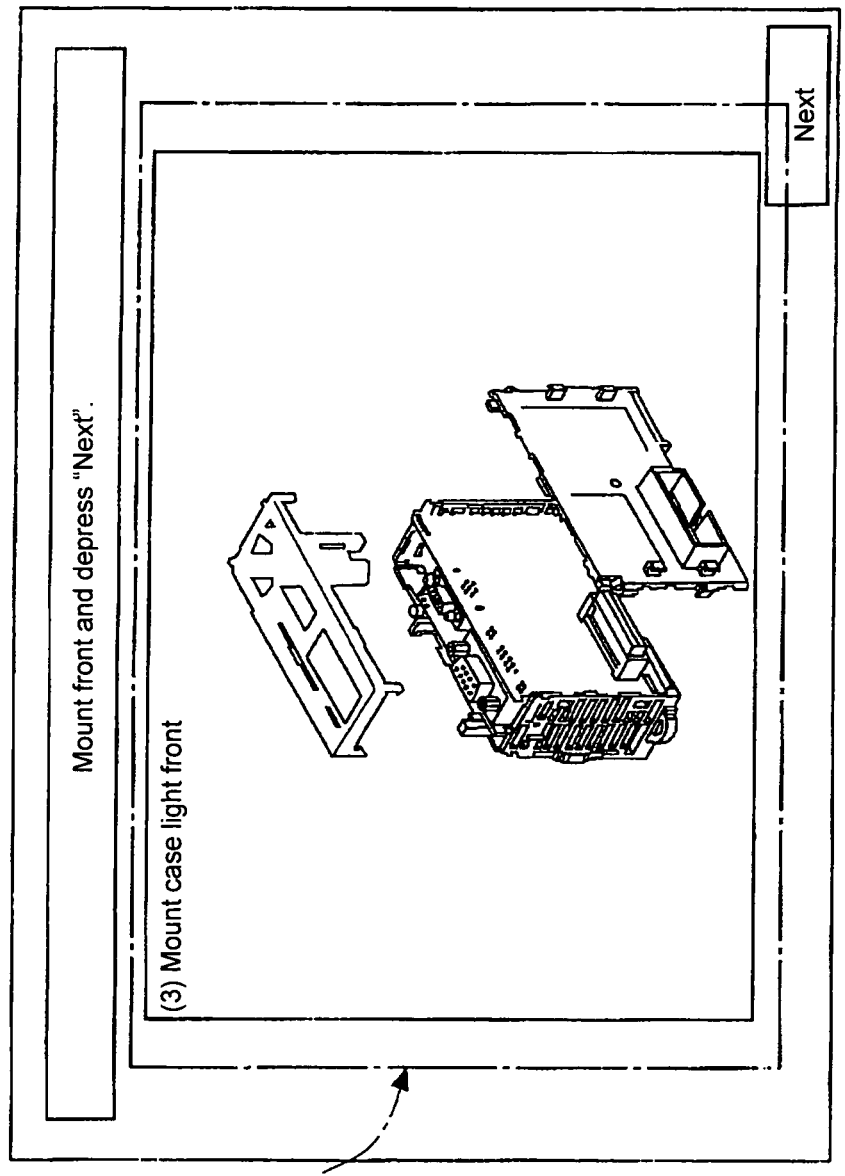
FIG. 18 shows part two of a diagram for explaining an example of the production command screen.

A second diagram for explaining an example of the production command screen is shown in FIG. 18. In this production command screen, a parts screen including the contents portion C6 defined by the one-dot chain is arranged and displayed on the background screen. This contents portion C6 is also intended to display the procedure for assembling a housing of a sort of an electronic device using a perspective illustration. These contents, therefore, are also regarded as confidential information containing the important production techniques and know-how and stored not in the PT device 1 but in the server device 2.

As described above, in the PT system management method according to embodiments of the invention, the non-confidential data are stored in the nonvolatile memory of the PT device, while the confidential data portion is stored in the nonvolatile memory of the server device. Further, the nonvolatile memory of the PT device has stored therein the data indicating the storage position of the confidential data portion in the server device. In the case where the screen including the confidential data is displayed on the display of the PT device, the confidential data are acquired by being downloaded from the server device based on the data indicating the storage position in the nonvolatile memory of the server device and stored in the volatile memory of the PT device. Subsequently, an intended screen is plotted and displayed based on the non-confidential data stored in the nonvolatile memory of the PT device and the confidential data stored in the volatile memory of the PT device.

With the PT system and the management method described above, therefore, a screen having arbitrary contents can be displayed on the display screen while at the same time positively preventing the exposure of the confidential contents.

According to this invention, there is provided a PT system, a PT device and a PT system management method in which a screen having arbitrary contents can be displayed on the display screen on the one hand and the leakage of the confidential contents can be positively prevented on the other hand.

What is claimed is:

1. A programmable terminal system including at least a programmable terminal device having a display panel and a server device connected with the programmable terminal device over a network, the system comprising:
- a nonvolatile memory within the programmable terminal device configured to store a screen data file defining a configuration for each available screen using part configuration information, the part configuration information divided into two groups, a first group including content acquired from the server device and including storage location information of content data in the server device and a second group corresponding to the part not including the content;
- a volatile memory within the programmable terminal device;
- a screen display processing unit comprising a display screen determination part configured to determine a corresponding screen to be displayed and a screen display control part for displaying the corresponding screen on the display panel based on the screen data file stored in the nonvolatile memory of the programmable terminal device, the screen display control part comprising:
- a first display control part configured to control display of part configuration information in the second group by using the part configuration information included in the screen data file in the nonvolatile memory, and
- a second display control part configured to control display of part configuration information in the first group, wherein the second display control part sends a transmission request command through the network to the server device, the transmission request command including storage location information of the content data in the server device, and wherein the second display control part is configured to receive a response from the server device including content data for storage in the volatile memory wherein a requested part is displayed using the content data in the volatile memory and the part configuration information in the screen data file of the nonvolatile memory;
- a nonvolatile memory within the server device configured to store the content data to be downloaded to the programmable terminal device;
- a content data search part configured to search the nonvolatile memory of the server device for the corresponding content based on the storage location information included in the transmission request command;
- a response transmission part configured to transmit a search result from the content data search part to the programmable terminal device together with the response to the transmission request command;
- a checking mechanism configured to check the volatile memory for the corresponding content data before transmitting the transmission request command to the server device through the network;
- an updating mechanism configured to extract update information and insert the update information in the transmission request command, when the corresponding content data is found in volatile memory; and
- a comparing part configured to compare update information included in the transmission request command with the update information attached to the content data retrieved from the nonvolatile memory before response transmission, and when the update data are identical, prohibiting a transmission of retrieved content data to the programmable terminal device.

* * * * *